April 28, 1970     F. T. STÅHL ET AL     3,508,772
FACE SEAL FASTENING

Filed May 22, 1967

United States Patent Office 3,508,772
Patented Apr. 28, 1970

3,508,772
FACE SEAL FASTENING
Filip Torvald Ståhl, Alvsjo, and Sixten Englesson, Djursholm, Sweden, assignors to Stenberg-Flygt, AB, Solna, Sweden, a corporation of Sweden
Filed May 22, 1967, Ser. No. 640,297
Claims priority, application Sweden, June 3, 1966, 7,697/66
Int. Cl. B60b 27/06; F16d 1/06
U.S. Cl. 287—52.05    3 Claims

ABSTRACT OF THE DISCLOSURE

In a pump shaft face seal comprising a stationary member secured to the pump casing and a rotatable member, the latter being fastened to the pump shaft by means of a ball engaging a groove in said member and a recess provided in the shaft, said ball being maintained in position by an extension spring extending through the ball and around the shaft.

---

Conventional face seals comprise a stationary sealing ring and a rotating sealing ring. The former is generally fastened to a stationary member, a pump casing for instance, while the latter is to be secured to a rotatable member, a pump shaft for instance, driven by the same.

The invention relates to an easily detachable fastening device for fastening the rotating member of a face seal to a rotatable shaft so as to achieve a driving function and in part also an axial one. Such a device is also called a face seal fastening and may, of course, also be used for retaining and axially fixing a stationary member to a stationary support.

There are various different kinds of prior art face seal fastenings having their specific advantages and drawbacks. It is, for instance, known to use stop or tightening screws. Such a fastening requires, however, that the seal be accessible from the side, which is not always possible.

It is further known to use a cylindrical pin, a wedge or a ball recessed in a shaft. This weakens, however, the shaft which, in this type of structure, cannot be pulled out through the bearing seat. The pin, the wedge or the ball may furthermore be lost during assembling and removal operations.

One sometimes uses a rubber friction ring for said purpose. Such a ring locks itself, however, so strongly onto the shaft, that special tools are required for stripping it off.

It is also known in the prior art to provide a locking by means of a taper sleeve but experience has shown that the drive obtained is unsatisfactory.

Splines are a very reliable and easily mountable and removable device for such a purpose but this is unfortunately a very expensive solution.

It is also known in the prior art to provide a helical spring with undersize windings whereby driving is achieved in the winding direction of the spring. This design can, however, not be used in machines with different directions of rotations or when the direction of rotation cannot be definitely determined beforehand.

The invention has for its object to provide a face seal fastening which overcomes most of the above-named drawbacks and at the same time is low-priced, sturdy and easy to mount and to remove.

The invention thus relates to a face seal fastening for locking the rotatable member of a face seal to a rotatable shaft and for fastening the non-rotatable member of a face seal to a stationary support, the face seal fastening being substantially characterized by at least one driving member arranged to engage partly a recess in the shaft and partly a groove in the rotatable member as well as by a removable holder for the driving member or members, which holder resiliently grips the shaft.

Figure 1:
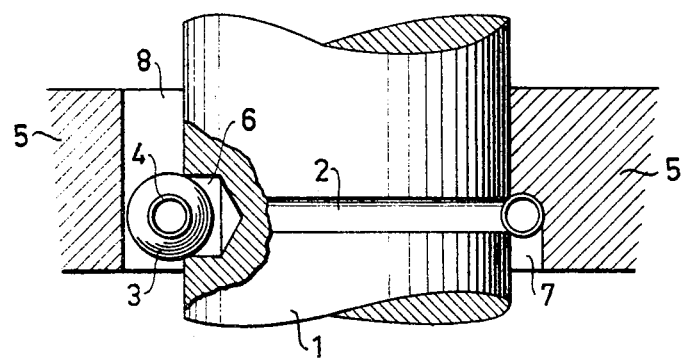
Figure 2:
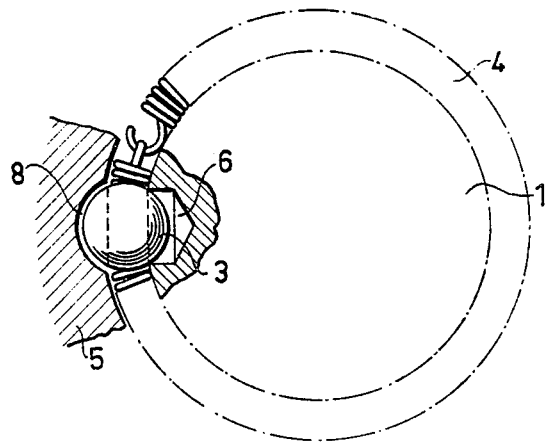
Figure 3:
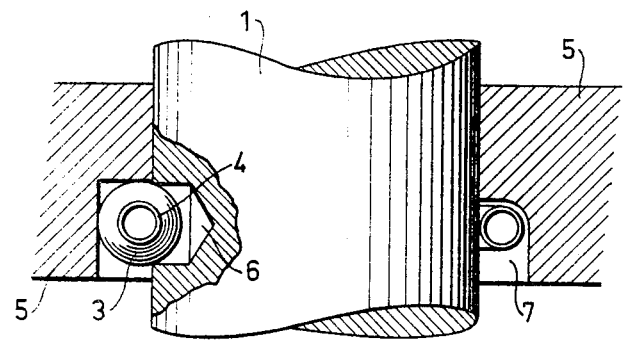
Figure 4:
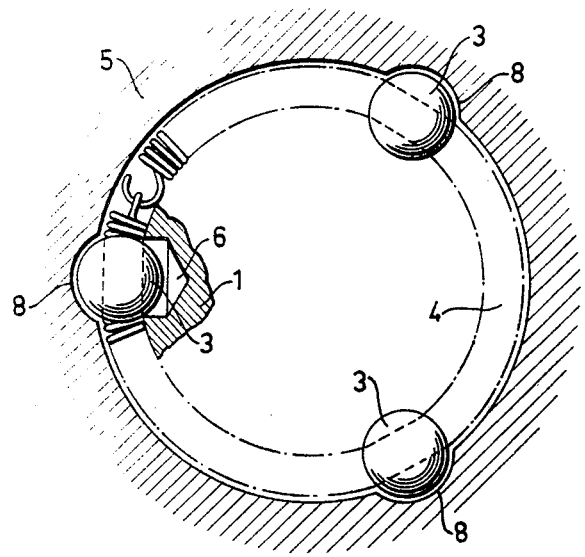
Figure 5:
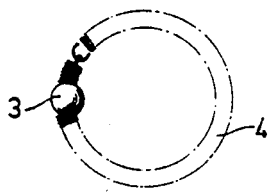
Figure 6:
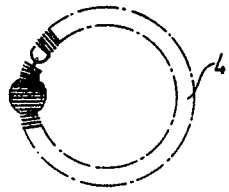
Figure 7:
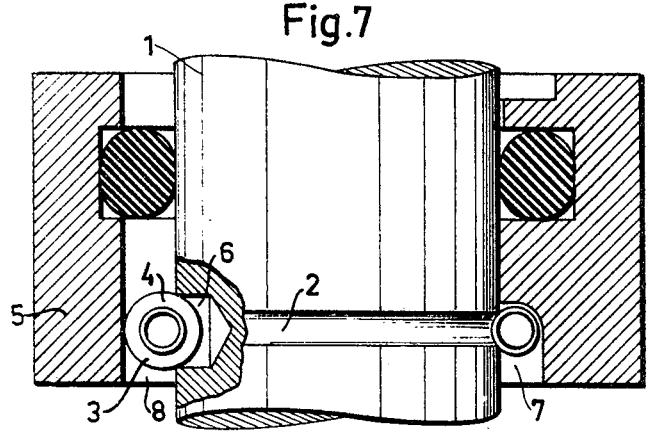
Figure 8:
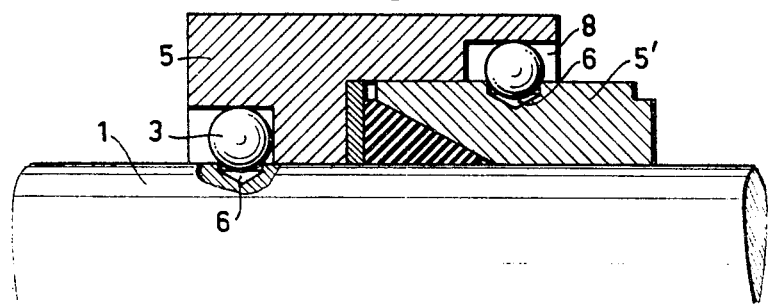
Figure 9:
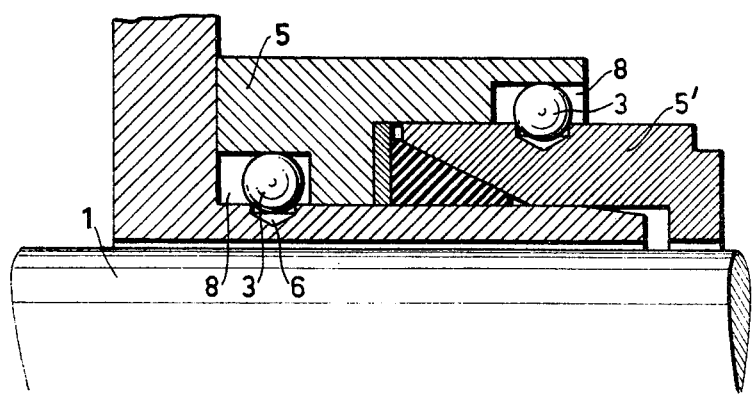

The invention will be more particularly described hereinafter with reference to the accompanying drawings, in which FIG. 1 is an axial section through an embodiment with a groove in the shaft, FIG. 2 is a radial section through the embodiment shown in FIG. 1, FIG. 3 is an axial section, through an embodiment with a plain shaft, FIG. 4 is a radial section through an embodiment with three driving balls, FIG. 5 is a view of an embodiment of a driving member holder comprising a helical spring (extension spring) and a ball, FIG. 6 is a view of another embodiment of the driving member holder comprising a helical spring with varying diameter, FIG. 7 is a view of an embodiment comprising an O-ring gasket as an extra sealing between the shaft and the rotatable member, FIG. 8 is a view of an embodiment comprising two face seal fastenings according to the invention, and FIG. 9 is a view of an embodiment in which also the non-rotatable face seal member is fastened to a stationary part by means of the device according to the invention.

In the embodiment shown in FIGS. 1 and 2 the rotatable shaft 1 is provided with a groove 2, the diameter of which is, for instance, 1 mm. less than the diameter of the shaft. The shaft 1 is further provided with a hole 6 extending radially with its center at the same level as the middle of the groove. A ball 3 provided with a central hole is threaded on a holder 4, in the present case a cylindric helical spring or an extension spring. Instead of said helical spring a rubber ring or a ring of any other material can also be provided for constituting the holder 4. The face seal member 5 which is to be driven by the shaft 1, is provided with a recess 7, the diameter of which corresponds to the shaft 1 plus the mounted holder 4.

The member 5 is further provided with a through-going axial groove 8 in the opening for the shaft 1.

When assembling the above described face seal fastener the ball 3 is threaded on the helical spring 4. The spring is hooked up so as to form a ring around the shaft 1 and placed in the groove 2 with the ball 3 engaging the hole 6. The rotatable face seal member 5 is thereafter positioned on the shaft 1 with the holder 4 and the ball 3 so that the ball engages the axial groove 8 and the bottom of the recess abuts the holder 4, that is to say, the helical spring. The rotatable member 5 is thus drivingly connected with the rotatable shaft 1 and simultaneously fixed in one axial direction (downwardly in FIG. 1) and can thus absorb the axially directed sealing pressure of the face seal.

When the face seal fastener according to the invention is to be dismantled, the member 5 is simply lifted against the action of the spring or the like which provides the sealing pressure, and the helical spring 4 is removed, whereupon the member 5 is again released downwards, an operation which takes only a few seconds.

The embodiment according to FIGS. 1 and 2 presents the following advantages:

accurate axial fixing,
powerful driving independently of the direction of rotation,
simple and rapid mounting and removal,
the shaft can be removed through the bearing seat, insignificant weakening of the shaft.

FIGS. 3 and 4 show an alternative embodiment in which the shaft 1 need not be provided with a groove 2. The shaft 1 is instead provided with three recesses 6 corresponding to the three balls on the holder 4 and three axial grooves 8 in the member 5. Said axial grooves 8 are, however, not through-going, contrarily to what was shown in the embodiment of FIG. 2. The balls 3 thus have two functions, i.e. to provide both in the peripherical direction as well as fixation in one axial direction.

FIGS. 5 and 6 represent various possible embodiments of the holder 4 for the driving member 3. The embodiment according to FIG. 5 has already been described above in relation to FIGS. 1 and 2.

Another embodiment of the holder 4 may be conceived as shown in FIG. 6. In said embodiment the ball is replaced by a helical spring with varying diameter.

Particularly if the groove 8 is through-going, a sealing should be provided between the face seal proper and the shaft 1. Such an embodiment is shown in FIG. 7 where an O-ring gasket solves this problem in a conventional manner.

Another practical embodiment is shown in FIG. 8. A face seal fastening is provided in the manner described above and drives a face seal bush or the like. The latter thus rotates with the shaft 1 and drives in turn the rotatable face seal ring proper by means of a second face seal fastening.

As already mentioned, the device according to the invention is not only provided for the locking of the rotatable member of the face seal to a rotatable shaft but it can also be used for fastening the non-rotatable member of the face seal to any stationary support. Such an embodiment is shown in FIG. 9. In this case the fastening also provides an accurate axial fixation which is simple, allows rapid mounting and removal and is independent of the direction of the rotation of the shaft.

Although the invention has been described in connection with embodiments shown in the drawing, it is obvious that many alterations and modifications may be made within the scope of the appending claims.

What we claim is:

1. A face seal fastening for tangential and monodirectional axial locking of a rotatable member of a face seal to a rotatable shaft comprising: at least one driving ball partly seated in at least one radial bore in the periphery of said shaft and partly in the closed end of a non-through-going axial groove on the inner periphery of said rotatable member, a removable ring-shaped extension holder secured to said driving balls and resiliently gripping about the periphery of said shaft, said driving balls being arranged to achieve axial fixation of said rotatable member in one direction only by abutment against the bottom of said axial groove, said extension consisting of an extension spring penetrating said balls and having interconnected ends.

2. A face seal fastening according to claim 1 wherein said holder is introduced into a groove provided along the periphery of said rotatable shaft and is locked in said groove when balls are introduced in the respective radial recesses in said shaft.

3. A face seal fastening for tangential and monodirectional axial locking of a rotatable member of a face seal to a rotatable shaft comprising: at least one driving ball partly seated in at least one radial bore in the periphery of said shaft and partly in the closed end of a non-through-going axial groove on the inner periphery of said rotatable member, a removable ring-shaped extension holder secured to said driving balls and resiliently gripping about the periphery of said shaft, said driving balls being arranged to achieve axial fixation of said rotatable member in one direction only by abutment against the bottom of said axial groove, and wherein said extension holder consists of a rubber ring carried by said balls.

References Cited

UNITED STATES PATENTS

| | | | |
|---|---|---|---|
| 1,864,683 | 6/1932 | Varden | 277—81 X |
| 2,039,787 | 5/1936 | Fogelstrom. | |
| 2,539,821 | 1/1951 | Eames | 287—52.05 |
| 2,571,653 | 10/1951 | Bastien. | |
| 2,255,217 | 9/1941 | Hill | 85—8.8 |
| 2,815,229 | 12/1957 | Cook | 287—52.05 |
| 2,895,754 | 7/1959 | Wurzel | 287—53 |
| 2,939,643 | 6/1960 | Barsam | 287—53 |
| 3,085,820 | 4/1963 | Pollis | 85—8.8 X |
| 3,326,580 | 6/1967 | Munier et al. | 287—52.05 X |

REINALDO P. MACHADO, Primary Examiner

A. V. KUNDRAT, Assistant Examiner

U.S. Cl. X.R.

85—8.8